(12) United States Patent
Rinker et al.

(10) Patent No.: US 6,182,817 B1
(45) Date of Patent: Feb. 6, 2001

(54) FIELD REPLACEABLE HELICAL FLIGHT

(75) Inventors: Franklin G. Rinker, Perrysburg, OH (US); James L. Howe, Temperance, MI (US); Daniel A. Molnar, Perrysburg, OH (US)

(73) Assignee: Maumee Research & Engineering, Inc., Northwood, OH (US)

( * ) Notice: Under 35 U.S.C. 154(b), the term of this patent shall be extended for 0 days.

(21) Appl. No.: 09/201,693

(22) Filed: Nov. 30, 1998

(51) Int. Cl.[7] .................................................. B65G 33/26
(52) U.S. Cl. .............................................................. 198/671
(58) Field of Search ............................................. 198/677

(56) References Cited

U.S. PATENT DOCUMENTS

| | | | |
|---|---|---|---|
| 368,182 | * 8/1887 | Birkholz | 198/677 |
| 455,384 | * 7/1891 | Birkholz | 198/677 |
| 3,977,515 | * 8/1976 | Lewoczko | 198/213 X |
| 4,203,237 | * 5/1980 | Enters et al. | 37/43 E X |
| 4,519,496 | * 5/1985 | Ludvigsen | 198/676 X |
| 4,852,719 | * 8/1989 | Lapeyre | 198/666 X |
| 5,279,407 | * 1/1994 | Shobak | 198/677 |
| 5,429,581 | * 7/1995 | Michaud et al. | 194/54 X |
| 5,573,660 | * 11/1996 | Eicker et al. | 210/162 X |
| 5,687,832 | * 11/1997 | Thiessen | 198/676 X |
| 5,845,764 | * 12/1998 | Ommundsen | 198/677 X |
| 5,863,197 | 1/1999 | Boy et al. . | |

* cited by examiner

Primary Examiner—Christopher P. Ellis
Assistant Examiner—Kenneth W Bower
(74) Attorney, Agent, or Firm—MacMillan, Sobanski & Todd, LLC

(57) ABSTRACT

A screw having a field replaceable flight. The screw includes a barrel and a helical flighting that is removably attached to the barrel by a plurality of brackets. The helical flighting includes a plurality of segments, each segment includes first and second opposing faces having an opening extending there though and side edges. The segments are positioned side by side to generally cooperatively form the flighting of the screw. At least one face of each segment includes raised bosses. The raised bosses project perpendicularly outwardly from the face of the segment to form a pocket within which the bracket is received. The segments are removably attached to the barrel by inserting a segment forming part of the flighting within the pocket and then removably fastening the segment within the pocket.

20 Claims, 3 Drawing Sheets

FIELD REPLACEABLE HELICAL FLIGHT

FIELD OF THE INVENTION

The present invention relates generally to a field replaceable helical flight for use on a screw conveyor, auger or like transporting, conveying and propelling device. More particularly, the present invention relates to a screw having a field replaceable flight and a method of replacing the helical flight for use in a rotary hearth furnace and the like.

BACKGROUND OF THE INVENTION

Screw conveyers, augers and the like typically incorporate or comprise a screw member for propelling particulate, granular or other free flowing material along the length of a barrel in an axial direction as determined by the rotation of the screw. The propulsion of the material is achieved by the successive turns of a continuous helical (spiral) blade (known in the art as flighting) secured to and radiating from a central driving shaft or barrel which is arranged for rotation by an appropriate power source (manual or otherwise).

In the case of a screw conveyor, the material being propelled by the successive turns of the flighting is confined to the spaces between successive turns by a casing which encloses and cooperates with the outer periphery of the flighting. Though in some cases the screw member is of integral form, in most cases and for a variety of reasons, it is customary to form the flighting separately and independently of the barrel. The flighting typically consists of a helicoid (helical rolled from a flat steel bar) flighting welded directly to the barrel. It will be appreciated that it is found in practice, that the flight wears due to the friction of the material being axially propelled by the flighting thereby requiring replacement of either the flighting or the entire screw. It will also be appreciated that the flighting and the barrel are typically made from similar materials because of the problems otherwise presented by different coefficients of expansion of dissimilar materials.

When replacement of flighting is required, the flighting is typically removed by flame cutting the flighting flush with the barrel. The barrel is then ground smooth prior to attaching new flighting. The new flighting is then carefully tacked to the barrel in a helical pattern by welding. It will be appreciated that this procedure is a very time consuming and labor intensive procedure.

It will be appreciated from the foregoing that there is a significant need for a new screw design that overcomes the problems of the prior art. In particular, what is needed a is screw design that incorporates a flighting design that allows for rapid and economical flighting replacement. It is an object of the present invention to provide a field replaceable helical flight for use on a screw conveyor, auger or like transporting, conveying and propelling devices. It is another object of the present invention to provide a screw having a field replaceable helical flight for use in a rotary hearth furnace subjected to temperatures required for lime calcination or iron-ore reduction. Yet another object of the present invention is to provide a helical flight of a screw that may be quickly replaced. Another object of the present invention is to provide a screw having a field replaceable flight and a method of replacing the helical flight that is simple and economical.

SUMMARY OF THE INVENTION

Briefly, the present invention relates to a screw having a field replaceable flight. The screw includes a barrel and a helical flighting that is removably attached to the barrel by a plurality of brackets. The helical flighting includes a plurality of segments, each segment includes first and second opposing faces having an opening extending there though and side edges. The segments are positioned side by side to generally cooperatively form the flighting of the screw. Two or more segments may be integrally joined in side by side relation or the segments may be independent of one another.

At least one face of each segment includes raised bosses. The raised bosses project perpendicularly outwardly from the face of the segment to form a pocket within which the bracket is received. Each bracket includes an attachment member of generally rectangular block shape having first and second opposing faces and a curvilinear lower edge, the lower edge being contoured to conform to the radius of the barrel. The attachment member also includes an opening extending through the faces sized to receive a mechanical fastener.

The segments are removably attached to the barrel by inserting a segment forming part of the flighting within the pocket and then removably fastening the segment within the pocket. In a preferred embodiment, the segments are removably attached to the brackets by mechanical fasteners.

BRIEF DESCRIPTION OF THE DRAWING

Further features and other objects and advantages of this invention will become clear from the following detailed description made with reference to the drawings in which.

DESCRIPTION OF THE PREFERRED EMBODIMENTS

Figure 1:
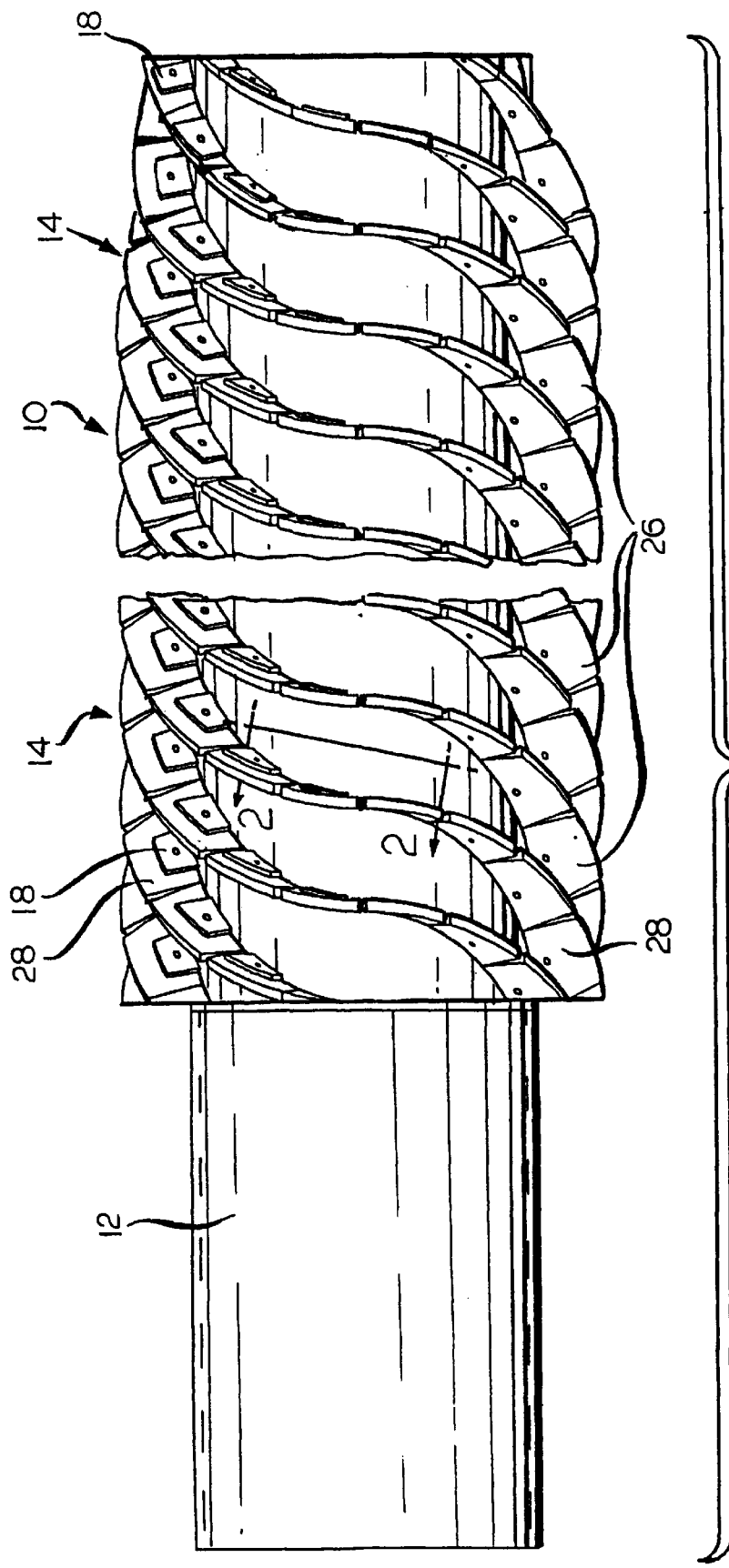
FIG. 1 is a partial side view of a screw including a helical flight in accordance with the present invention.

Referring to the drawings, wherein like reference characters represent like elements, there is shown in the figures a screw 10 for conveying material. The screw 10 is adapted to rotate within a housing (not shown) on a common longitudinal axis as well known in the art. It will be appreciated that for purposes of clarity, certain details of construction are not provided in view of such details being conventional and well within the skill of the art once the invention is disclosed and explained.

As shown in FIG. 1, the screw 10 includes a barrel 12 and a helical flighting 14 formed of a material suitable for the material to be conveyed. The barrel 12 of the screw 10 is of a cylindrical shape and may be formed hollow or solid as desired. Attached about the circumference of the barrel 12 in a helical pattern is the helical flighting 14.

Figure 2:
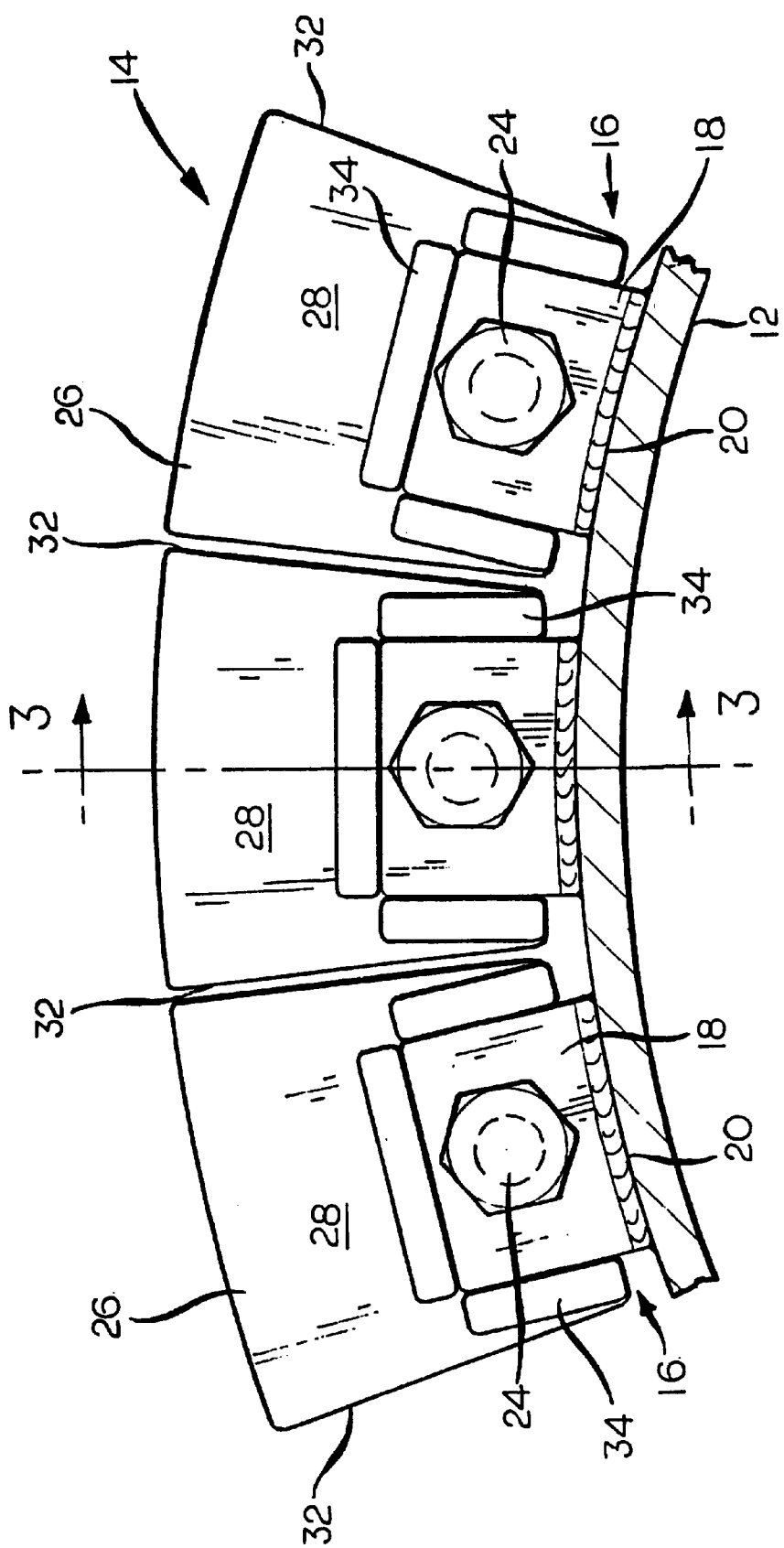
FIG. 2 is an enlarged partial view of three segments forming the helical flight of FIG. 1.
Figure 3:
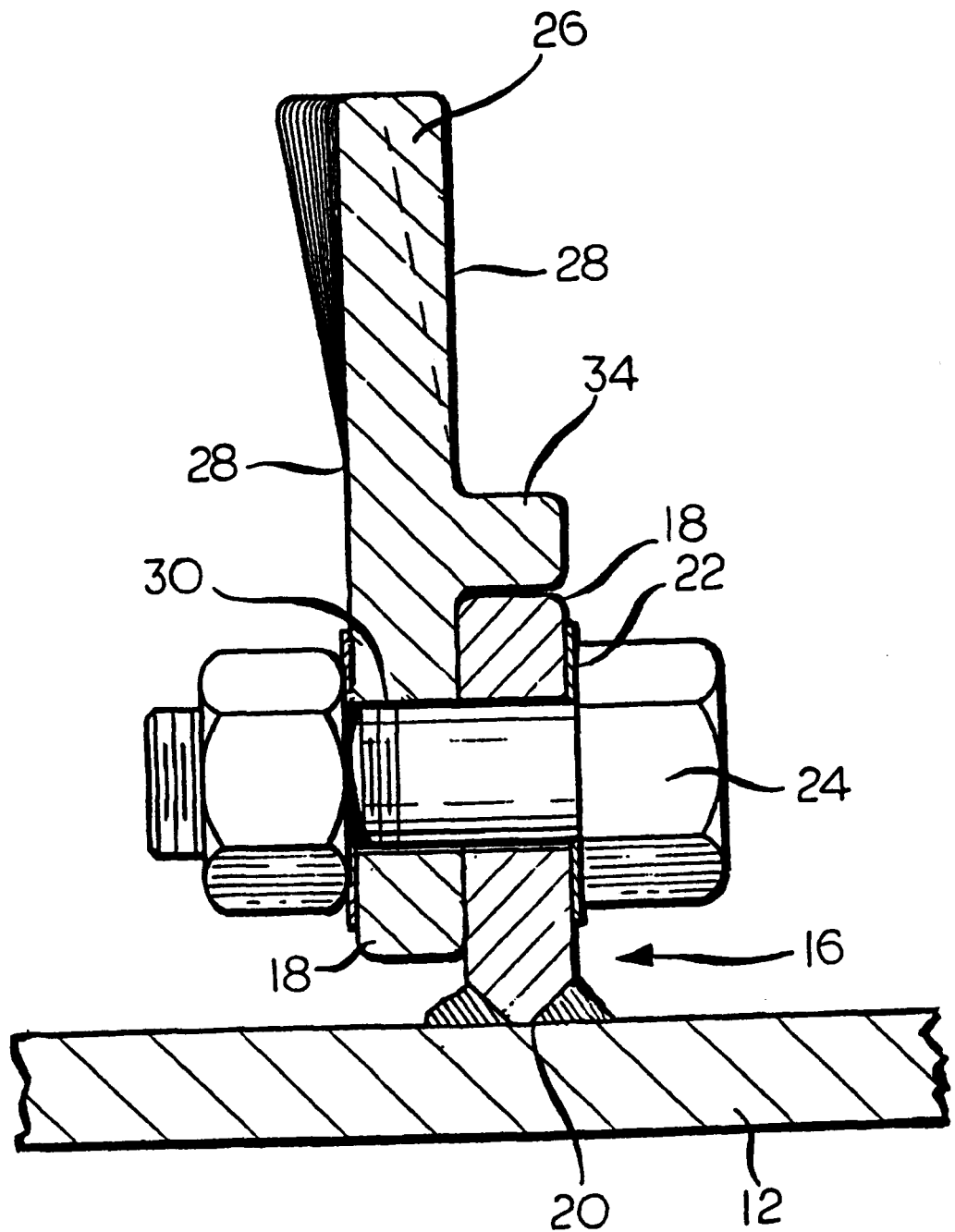
FIG. 3 is an enlarged view of the attachment of a segment to a barrel of the screw of FIG. 1.

As shown in FIGS. 1–3, the helical flighting 14 is attached to the barrel 12 by a plurality of brackets 16. Each bracket 16 includes a substantially planar attachment member or plate projecting radially outwardly from the barrel 12 surface. The attachment member is of a generally rectangular block shape having first and second opposing planar faces 18 and a curvilinear lower edge 20. The lower edge 20 is contoured to conform to the radius of the barrel 12. The attachment member includes an opening 22 through the planar faces 18 and is sized to receive a mechanical fastener 24 as further described below. The brackets 16 are attached directly along the circumference of the barrel 12 by welding.

In a preferred embodiment, the brackets 16 are welded directly to the barrel 12 surface by alternately applying a weld on each side of the attachment member for a total of 6 passes per ¾ inch flight segment. However, it will be appreciated that the method of securing the bracket 16 to the barrel 12 may be varied as desired depending upon the operating environment of the screw 10.

Removably attached to each bracket 16 is a flighting segment 26. The flighting segments 26 are positioned side by side to generally cooperatively form the flighting 14 of the screw 10. Two or more segments 26 may be integrally joined in side by side relation or the segments may be installed independent of one another. Each segment 26 includes first and second opposing faces 28 having an opening 30 extending there though and side edges 32. The opposing faces 28 are profiled to follow the path of the helical flighting 14 and the side edges 32 of the segments 26 are angled to conform to the circumference of the barrel 12 and allow the adjacent segments to form a substantially continuous flighting 14 structure. A wear resistant material such as a hard facing material containing tungsten carbide and the like may be applied along the working surface of the segment. The height (H) and width (W) of each segment may be varied as a function of the diameter of the barrel 12 and the material to be conveyed.

Formed on at least one face 28 of each segment 26 are raised bosses 34. As shown in FIGS. 2 and 3, the raised bosses 34 project perpendicularly outwardly from the face 28 of the segment 26 to form a pocket within which the bracket 16 is received. The raised bosses 34 assure proper alignment and non-twisting of the segment 26 when attached to the bracket 16. The bosses 34 may be formed separate from the segment 26 and then welded to the segment or the bosses may be formed integral with the segment. In a preferred embodiment, the raised bosses 34 are cast integral with the face 28 of the segments 26.

The replaceable flighting segments 26 are attached to each bracket 16 with a mechanical fastener 24. Each bracket 16 is inserted within the pocket and the opening 30 of the segment is aligned with the opening 22 of the bracket 16. The fastener 24 is then inserted through the openings 22 and 30 and tightened to secure the segment 26 to the bracket 16. The mechanical fastener 24 may be a commercially available fastener of a type well known in the art. In a preferred embodiment, the mechanical fastener 24 is an alloy bolt fastener and a nut and washer.

Removal of either a worn segment 26 or the entire flighting 14 requires simply loosening or cutting the mechanical fastener 24 and removing the fastener and worn segment or flighting as desired. A new segment 26 or flighting 14 is then simply fastened to the existing bracket 10 as described above. It will be appreciated that no special skill is required to replace segments 26 or flights 14 and time of replacement is minimized.

It will be appreciated that because the segment 26 and barrel 12 are formed separate from one another and are mechanically removably attached as described above, the coefficient of expansion of the materials forming the segment and barrel is not critical. Under high operating temperatures, such as in a rotary hearth furnace during lime calcination or iron-ore reduction and the like, the coefficient of expansion of the materials forming the helical flighting and the barrel would otherwise be very important. In accordance with one aspect of the present invention, the segments and barrel may be formed of different materials having different coefficients of thermal expansion. For example, the segments 26 may be formed of a high temperature abrasion resistant material such as a suitable cast iron or stainless steel and the like and the barrel may be formed of a suitable carbon steel and the like.

Although the invention was primarily developed in connection with a screw 10 of a screw conveyor and it is thus described herein, it will be readily apparent that the present invention may be used with equal facility with other transporting, conveying and propelling devices such as augers and the like and the description of the same in relation to a screw is not to be construed as a limitation on the scope of the invention.

The patents and documents described herein are hereby incorporated by reference.

Having described presently preferred embodiments of the invention, the invention may be otherwise embodied within the scope of the appended claims.

What is claimed is:

1. A screw having a field replaceable flight, the screw comprising:
   a barrel; and
   a helical flighting comprising a plurality of segments removably attached to the barrel by a plurality of brackets,
   wherein at least one face of each segment includes raised bosses projecting perpendicularly outwardly from the face of the segment to form a pocket for receiving a bracket of the plurality of brackets.

2. The screw of claim 1 wherein the barrel and the helical flighting are formed of dissimilar materials having different coefficients of thermal expansion.

3. The screw of claim 1 wherein each segment includes first and second opposing faces having an opening extending there though and side edges.

4. The screw of claim 3 wherein each segment includes a wear resistant material applied along a working surface of the segment.

5. The screw of claim 3 wherein the opposing faces are profiled to follow the path of the helical flighting and the side edges of the segments are angled to allow adjacent segments to form a substantially continuous flighting path.

6. The screw of claim 3 wherein the segments are positioned side by side to generally cooperatively form the flighting of the screw.

7. The screw of claim 6 wherein two or more segments are integrally joined in side by side relation.

8. The screw of claim 6 wherein the segments are independent of one another.

9. The screw of claim 1 wherein the screw is of a cylindrical shape.

10. The screw of claim 9 wherein each bracket includes an attachment member of generally rectangular block shape having first and second opposing faces and a curvilinear lower edge, the lower edge being contoured to conform to the radius of the barrel.

11. The screw of claim 10 wherein the attachment member includes an opening extending through the faces sized to receive a mechanical fastener.

12. The screw of claim 10 wherein the brackets are attached directly along the circumference of the barrel by welding.

13. The screw of claim 12 wherein the brackets are welded directly to the barrel surface by alternately applying a weld on each side of the attachment member for a total of 6 passes per ¾ inch flight segment.

14. A method of removably attaching replaceable flighting segments to a barrel of a screw, the method comprising the steps of:

providing a barrel having a plurality of brackets;

providing a plurality of segments having at least one face with raised bosses forming a pocket;

inserting a bracket of the plurality of brackets within the pocket formed by the raised bosses;

removably fastening the segment to the bracket.

15. The method of claim 14 wherein the barrel and the helical flighting are formed of dissimilar materials having different coefficients of thermal expansion.

16. The method of claim 14 wherein each bracket and each segment include openings to receive a mechanical fastener.

17. The method of claim 16 wherein the mechanical fastener is inserted through each opening and tightened to secure the segment to the bracket.

18. A screw having a field replaceable flight, the screw comprising:

a barrel; and a helical flighting comprising a plurality of segments removably attached to the barrel by a plurality of brackets, wherein the plurality of brackets are welded directly to the barrel surface by alternatively applying a weld on each side of an attachment member.

19. The screw of claim 18 wherein the attachment member is of a generally rectangular block shape having first and second opposing faces and a curvilinear lower edge, the lower edge being contoured to conform to the radius of the barrel.

20. The screw of claim 19 wherein the attachment member includes an opening extending through the faces sized to receive a mechanical fastener.

\* \* \* \* \*